July 29, 1941.       T. A. RICH       2,251,003
CONTROL DEVICE
Filed Nov. 29, 1938       2 Sheets-Sheet 1

Inventor:
Theodore A. Rich,
by Harry E. Dunham
His Attorney.

July 29, 1941.  T. A. RICH  2,251,003
CONTROL DEVICE
Filed Nov. 29, 1938  2 Sheets-Sheet 2

Inventor:
Theodore A. Rich,
by Harry E. Dunham
His Attorney.

Patented July 29, 1941

2,251,003

UNITED STATES PATENT OFFICE 2,251,003

CONTROL DEVICE

Theodore A. Rich, Schenectady, N. Y., assignor to General Electric Company, a corporation of New York Application November 29, 1938, Serial No. 243,032

24 Claims. (Cl. 200—137)

This invention relates to control devices, more particularly control devices for controlling an electric circuit in response to changes in temperature and has for its object the provision of an improved device of this character. While not limited thereto, this invention is particularly applicable to control devices for controlling the heating circuit of an electrically heated device such as an electric flat iron.

In electrically heated devices it is customary to arrange the control device in direct thermal relation with the medium being controlled. For example, in an electrically heated flat iron, a portion of the controlling device, particularly the bimetallic element, is clamped to the sole plate and another portion is free to move as the temperature of the sole plate varies and thereby operates a controlling switch for the iron. It has been found in devices of this character, where a portion only of the bimetallic element is in thermal relation with the heated body or medium, that when the device is being initially heated from room temperature there is a tendency for the temperature of the heated body or medium to rise more rapidly than the temperature of the bimetallic element. Due to this rapid rise in temperature during the first heating cycle, there occurs a temperature overshoot; i. e., the temperature at which the bimetallic element operates to open the heating circuit in the first cycle is higher than the cut off temperature of the succeeding cycles. In addition, it has been found with such arrangements that when the heating device, for example, an electric flat iron, is subjected to load, the temperature of the heated body falls more rapidly than that of the bimetallic element and the heated body attains a temperature lower than desired. This decrease in temperature of the heated body with increase in load is termed the regulation of the heating device and in the arrangement under discussion the regulation has been found to be particularly poor.

In its broad aspects this invention contemplates the provision of an improved construction and arrangement of a control device so as to substantially improve the regulation of an electric heating circuit and to substantially eliminate temperature overshoot therein.

It has been found that these desirable features could be obtained if a portion of the heating device itself was employed as a temperature responsive element. The problem in this connection is to obtain accurate and reliable means for amplifying the movement of the selected portion of the heated body in accordance with thermal changes. In another aspect, therefore, this invention contemplates the provision of an improved and reliable construction and arrangement for amplifying the movement of a heated member in response to thermal changes.

In still another aspect, this invention contemplates the provision in a control device of novel means for actuating said control device with any desired degree of snap-action.

In accordance with this invention in one form thereof there is provided a temperature control device for an electric iron, the thermal responsive element of which is the sole plate of the iron. Attached to the sole plate in such a manner as to be affected by the expansion thereof is a movement amplifying system comprising a rocker having a plurality of curved surfaces at least one of which has a curvature different from and continuously varying with respect to the remaining surfaces. Connected to the rocker at one end thereof and adapted to engage or be wrapped or wound upon the surface having said different curvature is a substantially non-expansible member which is attached at its opposite end to the sole plate of the iron. Connected to the rocker at the opposite end thereof and adapted to engage or be wrapped or wound upon the remaining surfaces of the rocker is a plurality of resilient members which are attached to the sole plate of the iron at a point remote from the point at which the non-expansible member is attached. The sole plate, non-expansible member, rocker, and resilient member are interconnected and form a closed mechanical loop so that expansion of the sole plate relative to the non-expansible member and the resilient members causes the rocker to be rotated and by means of the surfaces of different curvature on the rocker relatively small movements of the sole plate are amplified to relatively large angular movements of the rocker. Contact means are associated with the rocker and are adapted to be actuated thereby. By providing a surface on the rocker the curvature of which continuously varies with respect to the remaining surfaces on the rocker, the contact means are operated with snap-action.

For a more complete understanding of my invention reference should be had to the accompanying drawings in which.

Figure 1:
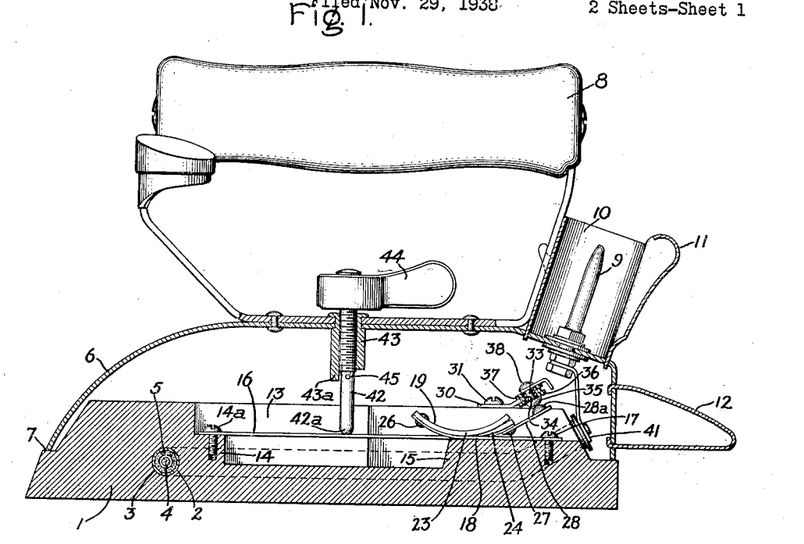
Fig. 1 is an elevation partly in section of an electric flat iron embodying one form of this invention.
Figure 2:
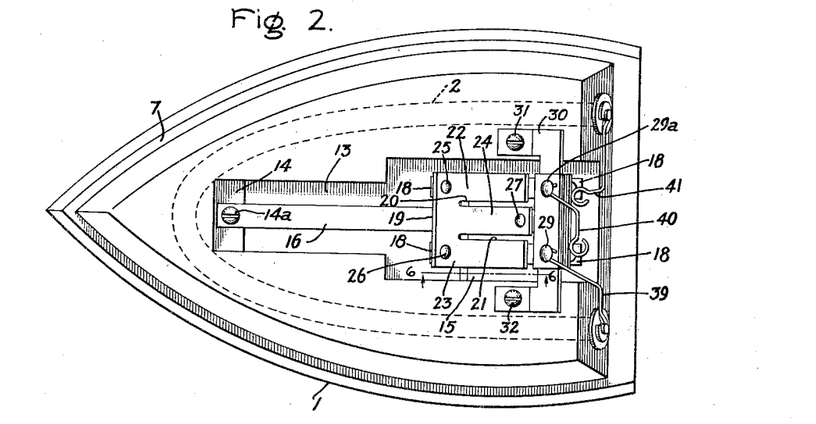
Fig. 2 is a plan view of the electric iron shown in Fig. 1 with the cover portion removed.

Referring to Figs. 1 and 2, this invention in one form is shown as applied to an electric iron comprising a heavy body member or sole plate 1 made of suitable heat conducting material capable of expanding with temperature, such as cast iron, or aluminum, within which is cast a suitable heating unit 2. Although any suitable heating unit may be employed, it is preferred to use a heating unit of the type described and claimed in the United States Patent 1,367,341 to C. C. Abbott dated February 1, 1921. Briefly, this unit comprises an outer metallic sheath 3 in which a helical heating resistor 4 is embodied in a compact mass of electrically insulating refractory material 5 such as magnesium oxide. The heating unit 2 is substantially U-shaped having its terminals brought out at the rear of the sole plate as shown in Fig. 2.

The upper portion of the body member or sole plate 1 is enclosed by a cover 6 resting on a shoulder 7 provided for it in the sole plate 1, the cover being secured to the sole plate by means of screws (not shown). Attached to the cover is a suitable handle 8 which may be grasped by the operator and provided on the cover are binding posts 9 which are adapted to be connected to the terminals of the U-shaped heating elements. The binding posts 9 are enclosed in a plug guide 10 attached to both the cover and the handle of the iron. Projecting from the plug guide 10 is the ear 11 which is adapted to cooperate with the bracket or stand 12 mounted on the rear wall of the cover to form a support for the iron in a vertical position.

In accordance with this invention, the sole plate 1 of the electric iron is used as an element of the temperature control device. As previously stated, the sole plate 1 is made of a material which expands with temperature. This movement of the sole plate is utilized for controlling the operation of the heating circuit. In the form of my invention shown in Fig. 1, a recess 13 is provided in the sole plate 1. Arranged within the recess 13 adjacent the forward end thereof, i. e. the end nearest the toe of the sole plate, is an abutment or ledge 14, and provided in the recess adjacent the opposite end thereof is a second abutment or ledge 15. Firmly attached to the ledge 14 by means of a screw 14a is a substantially non-expansible member 16, in the form of a thin strip, which may be of invar or any other suitable material. The essential consideration in the selection of a material for the member 16 is that its reaction to thermal changes be different from that of the sole plate. A substantially non-expansible material is preferred for the member 16. However, any material having different thermal properties than the material in the sole plate may be used, for example, a material having a substantially lower coefficient of expansion. It is to be understood that when a material other than the preferred substantially non-expansible material is used it is done so at some sacrifice of the performance obtained with the preferred material. Attached to the ledge 15 by means of screws 17 is a pair of resilient members 18, which are of some suitable resilient material such as spring steel.

Figure 3:
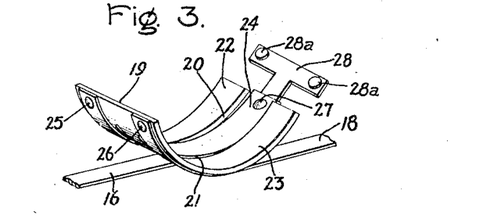
Fig. 3 is a detail perspective of the motion amplifying member shown in Figs. 1 and 2.

Arranged between the member 16 and the resilient members 18 is a member 19 which is shown in detail in Fig. 3. This member 19, which may be called a rocker, is made from a rectangular piece of metal, such as cold rolled steel. Two slots 20 and 21 are cut therein so as to form a plurality of legs comprising two outside legs 22 and 23 and an inside leg 24. After the slots 20 and 21 are cut into the rectangular plate it is rolled into a section of a cylinder imparting a curvature to the three legs 22, 23 and 24. The center leg is then bent outward so as to present a surface having a radius of curvature different from the surfaces presented by the outside legs 22 and 23. The purpose and effect of this construction will be more fully described hereinafter.

The resilient members 18 are firmly attached by means of rivets 25 and 26 to one end of the member 19 and extend across this member so as to be in engagement with the leg members 22 and 23 for a considerable portion of their lengths. In this respect, the resilient members 18 may be said to be wrapped about or wound on the legs 22 and 23. In a similar manner, the member 16 is wrapped around the center leg 24 and is firmly attached by means of a rivet 27 to the end of the center leg which is opposite the end of the member 19 to which the resilient members are attached. It is apparent that with such an arrangement, rotation of the rocker clockwise about the center of curvature of the outer legs 22 and 23 causes the resilient members to be further wrapped or wound onto the surface of the outer legs and causes the member 16 to be unwound or removed from engagement with an additional portion of the surface presented by the center leg. It is to be observed that the sole plate 1, the member 16, the rocker 19 and the members 18 are interconnected so as to form a closed mechanical loop. As will more fully appear hereinafter, this mechanical loop amplifies small linear movements into relatively large angular movements of the rocker member 19.

As previously mentioned, the members 18 are of some suitable resilient material, such as spring steel, and the member 16 is preferably of substantially non-expansible material in strip form. With such an arrangement the members 18 are relatively stiff and the member 16 is quite flexible. It is important that the member 16 have sufficient flexibility to permit it to be wound on the surface of leg 24 without taking on a permanent set. It is also important that the member 16 be of sufficiently small cross-section to allow a certain amount of stretching thereof when subjected to the stress present at the operating temperature. The members 18, being resilient and wrapped on the surfaces presented by the legs 22 and 23, tend to cause the rocker 19 to rotate in a counterclockwise direction. These members are such that if they alone were connected to the rocker it would be turned counterclockwise until the members were substantially horizontal throughout their lengths. It is thus apparent that with the resilient members wound on a portion of the surfaces presented by the legs 22 and 23; a substantial torque is applied to the rocker. This torque is sufficient to maintain the member 16 taut and to bias the rocker member in a counterclockwise direction.

Associated with the rocker 19 are suitable switch means adapted to control the heating circuit of the electric iron. In the arrangement shown in Figs. 1 and 2, the switch means includes a bracket 28 which carries a pair of spaced contacts 28a and is firmly attached by suitable means to one end of the rocker 19 and preferably to the center leg 24 thereof adjacent the end to which the member 16 is attached. The bracket 28 with its contacts 28a forms a bridging contact for a pair of fixed contacts 29 and 29a which are mounted on a bracket 30 which is rigidly secured to the sole plate 1 by means of screws 31 and 32 and is adapted to extend across the recess 13. Each of the fixed contacts 29 and 29a comprises a contact stud 33 which is insulated from the bracket by means of a collar 34 formed of suitable insulating material. Provided at one end of the stud 33 is a contact surface 35 made of some suitable material and arranged between the contact surface 35 and the bracket 30 is a sheet of insulating material 36, such as mica, for insulating these members from each other. On the opposite end of the stud 33 of each fixed contact is a lead which is insulated from the bracket 30 by means of a sheet of suitable insulating material 37 such as mica. Each of the fixed contacts is arranged on the bracket 30 in the manner indicated and the head 38 of the stud 33 is peened over so the component parts of the contact are firmly held together.

The fixed contacts 29 and 29a form a part of the heating circuit of the iron. The contact 29 is connected to one of the terminals of the heating unit 2 by means of a conductor 39. The second fixed contact 29a is connected through conductor 40 to one of the binding posts 9 and the second binding post 9 is connected to the remaining terminal of the heating unit 2 by means of conductor 41. Thus, when the iron is connected to a source of power, an electrical circuit is completed from the source through one binding post 9, conductor 41, heating unit 2, conductor 39, fixed contact 29, bridging contacts 28a, fixed contact 29a, conductor 40, second binding post 9 and back to the source. It is apparent that movement of the rocker clockwise will cause the bridging contact formed by bracket 28 and contacts 28a to be moved away from the fixed contacts and thereby open the heating circuit. It is also apparent that with the rocker member biased in the counterclockwise direction the bridging contact is biased to the circuit closing position.

In order to provide a control device capable of acting over an adjustable range of temperatures, an adjusting screw 42 having a rounded end 42a is threaded into a suitable sleeve 43 supported by the cover 6. A handle 44 is provided on the end of the adjusting screw to facilitate turning the screw and, as is well known in the art, suitable indicia (not shown) may be provided on the cover 6 adjacent the handle 44 for indicating the temperatures obtained with different settings of the adjusting screw. The rounded end 42a of the adjusting screw is adapted to engage the member 16 intermediate its ends. By advancing the adjusting screw against the member 16, this member is stretched a predetermined amount. This stretching of the member 16 by the adjusting screw may be considered as corresponding to the stretching of the member 16 which would result from an increase in length of the sole plate when subjected to a given temperature. It is apparent, therefore, that with the member 16 stretched a predetermined amount by the adjusting screw 42 less movement is required, through the expansion of the sole plate, to actuate the rocker and its associated switch means. Hence, a predetermined lower temperature of the sole plate will suffice to actuate the contacts. In order to limit the permissible rotation of the adjusting screw 42, the sleeve 43 is provided with an integral extension 43a at its lower end. This extension 43a is adapted to cooperate with a pin 45 provided on the adjusting screw and thereby forms a stop which constitutes an upper and lower limit of rotation for the adjusting screw.

It will be understood that the rocker member 19 is caused to rotate between two limiting positions corresponding to the circuit opening and circuit closing positions of the associated switch means. As previously mentioned, the leg 24 is bent outwardly with respect to the legs 22 and 23 and is thereby provided with a curvature different from that of legs 22 and 23. The character of the curvature of the surface presented by leg 24 as compared with the surfaces formed by legs 22 and 23 determines the amount of amplification obtained with any particular rocker and also the manner in which the rocker moves between its limiting positions. Thus, if the center leg is bent concentrically with respect to the surfaces formed by the legs 22 and 23 but on a radius differing from that of these legs, the amplification obtained will be proportional to the difference in radii of the surfaces and this difference in radii will remain the same throughout the rotation of the member 19 between its limiting positions. In other words, if the center leg 24, shown in Fig. 3, should be bent concentrically with respect to the surfaces of legs 22 and 23 but on a different radius, a given angular movement of the rocker 19 in the clockwise direction, for example, will cause a net increase in the length of the member 16 which is proportional to the difference in radii. Thus, a relatively small change in length of the member 16 causes a relatively large angular movement of the rocker, the amount of increased movement of the rocker being inversely proportional to the difference in radii of the surfaces provided thereon. In addition, since the difference in radii remains the same throughout the rotation of member 19, the switch means associated therewith will be actuated slowly, the resilient means serving only to maintain the member 16 taut.

If, however, the leg 24 is bent so as to present a surface so arranged with respect to the surfaces formed by legs 22 and 23 that the curvature thereof is continuously changing with respect to the curvature of the surfaces formed by legs 22 and 23, the amplification will be again proportional to the difference in radii between said surfaces but this difference in radii will vary as the member 19 is rotated. With such an arrangement the rocker and the switch means associated therewith will be moved between the circuit closing and circuit opening positions with a snap-action. The manner in which this snap-action is obtained can best be described in connection with the arrangement illustrated in Fig. 6 which represents an enlarged view of the rocker taken on line 6—6 of Fig. 2. In this arrangement, the center leg 24 has been bent downwardly to provide a surface which continuously varies in curvature with respect to the surface of leg 23. Assuming that the rocker is rotated, it will be observed that the distance L varies as the rocker is rotated. This distance L may be considered the arm through which the force transmitted to member 16 by expansion of the sole plate is transmitted to the rocker thereby subjecting the rocker to a torque tending to cause clockwise rotation thereof. The resilient member 18, as previously explained, subjects the rocker to a torque which tends to cause it to rotate in a counterclockwise direction. This torque is substantially constant throughout the rotation of the rocker. Thus, with a tension applied to the member 16 due to expansion of the sole plate upon an increase in temperature sufficient to produce a torque on the rocker greater than the torque produced by the resilient member, the rocker will rotate clockwise without further increase in temperature. This rotation of the rocker in a clockwise direction causes the distance L to increase. In addition, however, the tension in the member 16 decreases due to the fact that an additional portion of this member is unwound from the surface of the leg 24. If the surfaces of the legs 23 and 24 are designed in the manner indicated, then, the distance L between the surfaces will increase faster than the tension in the member 16 decreases during the clockwise rotation of the rocker. Under these circumstances the net effect is to produce a constantly increasing torque as the member is rotated thereby producing an acceleration of the rocker and movement thereof between its circuit closing and circuit opening positions quickly and with a snap-action. In a similar manner, with the surfaces arranged in the manner described, the rocker will be moved from its circuit opening to its circuit closing position with a snap-action for with the rocker moving in a counterclockwise direction the surfaces are such that the distance therebetween decreases faster than the tension in member 16 increases thereby producing acceleration of the rocker.

From the foregoing description, it will be observed that the operating characteristics of the rocker and its associated switch may be readily controlled by the designer. By suitably bending the center leg 24 it is possible to obtain a control device which will operate its associated switch means either with a snap-action or slowly or with an action which is the combination of both of these, such as a snap opening and slow closing. In addition, the amount of amplification may readily be controlled by suitably bending the center leg 24 thus making it possible to obtain a very large contact opening without increasing the amplitude of the switch, that is, the difference between circuit closing and circuit opening temperatures. In the preferred form of this invention, the leg 24 is bent outwardly with respect to the remaining surfaces 22 and 23 in such a manner that the distance between the surfaces increases as the rocker rotates in a clockwise direction and increases in such a manner that the rocker will be moved between its limiting positions with a snap-action as described above. In this form, the rocker member may be said to be provided with a plurality of surfaces at least one of which has a curvature different from and continuously varying with respect to the remaining surfaces. It is apparent that the number of surfaces on the rocker is not controlling. The essential consideration is the provision of a surface having a curvature different from and continuously varying with respect to another surface on the rocker.

In operation, with the bridging contact in its normally closed position across the fixed contacts 29 and 29a and the adjusting screw set for some predetermined temperature, a source of energy is connected to the terminal prong 9 thereby energizing the heating unit 2 and causing the sole plate 1 to be heated. The heating of the sole plate produces an expansion which exerts a torque through the member 16 on the rocker member 19 in the manner already described. This torque tends to cause the rocker to rotate in a clockwise direction against the torque exerted thereon by the resilient members 18. When the sole plate of the iron approaches the desired predetermined temperature, the torque exerted on the rocker by the expansion of the sole plate approaches the value of the torque exerted by the spring members 18. The latter torque, however, is still sufficient to maintain the contacts positively closed. Upon reaching the predetermined desired temperature, the torque exerted on the rocker by the expansion of the sole plate becomes slightly greater than the torque exerted thereon by the resilient members and the rocker tends to rotate clockwise. As this rotation proceeds, the tension in the member 16 decreases due to the fact that a portion of this member is unwound from the surface of leg 24, but at the same time the arm through which this force produces a torque on the rocker increases. The surfaces of the rocker, as previously pointed out, are so arranged that the length of the arm increases faster than the tension in member 16 decreases with the result that, as the rocker rotates clockwise, the torque causing the rotation continuously increases in value thereby causing an acceleration of the rocker member whereby the contact pressure between the contacts goes to zero rapidly and the contacts are opened with a snap-action.

With the contacts opened the heating unit 2 is deenergized and the temperature of the sole plate decreases causing the sole plate to contract. This contraction diminishes the torque exerted on the rocker arm through the member 16. When this torque decreases below the value of that exerted by the resilient members 18, the rocker will rotate in a counterclockwise direction. As the rocker rotates in this direction, the tension in the member 16 increases due to the fact that an additional portion thereof is wound on the surface presented by the center leg 24. At the same time the arm through which this force acts on the rocker decreases more rapidly than the tension in the member 16 increases. The net result is an acceleration of the rocker in a counterclockwise direction and the closing of the contacts with a snap-action. With the contacts closed, the heating unit 2 is again energized and the sequence of operation is repeated. It will be understood that the resilient members 18 bias the contacts closed and maintain a positive contact pressure therebetween.

Figure 4:
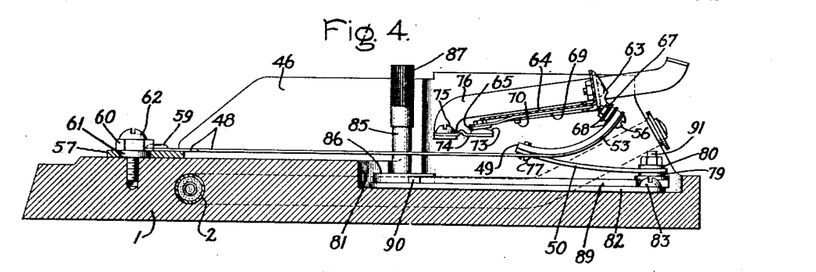
Fig. 4 is an elevation partly in section of an electric iron, with the cover removed, employing a modified form of this invention.
Figure 5:
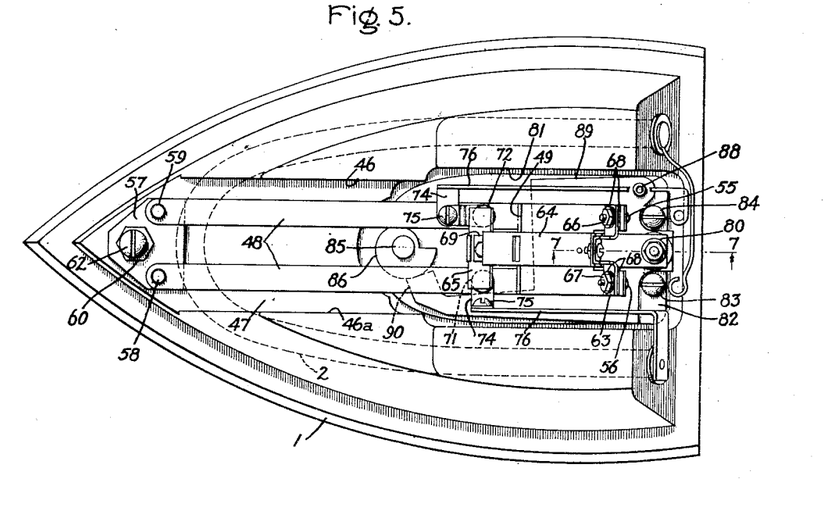
Fig. 5 is a plan view of the arrangement shown in Fig. 4.

In Figs. 4 and 5 a modified form of this invention has been illustrated. In this arrangement the sole plate 1 again is used as the temperature responsive element of the control device and it is heated by an electric heating unit 2 arranged therein as described in connection with Fig. 1. Integrally cast on the sole plate is a pair of side walls 46 and 46a which define a longitudinally extending passageway 47. Arranged within the passageway 47 are a pair of members 48, a curved or rocker member 49 and a member 50. The members 48 correspond to the member 16 illustrated in Fig. 1 and in the preferred form consist of thin strips of substantially non-expansible material having sufficient flexibility to permit a small amount of stretching and to permit wrapping on the surfaces of rocker 49 without taking on a permanent set. While a substantially non-expansible material is preferred, other material may be used as explained with reference to the member 16 of Fig. 1. The member 50 corresponds to the members 18 of Fig. 1 and is of resilient material capable of exerting a torque on the rocker member 49 and sufficiently resilient to maintain the members 48 taut.

Figures 6, 7:
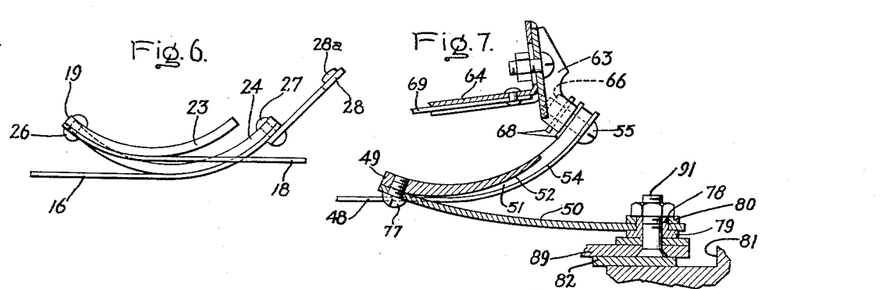
Fig. 6 is an enlarged view of the motion amplifying member taken on the line 6—6 of Fig. 2.
Fig. 7 is an enlarged detailed section taken on the line 7—7 of Fig. 5.

The rocker member 49 corresponds to the member 19 of Figs. 1 and 2 and is substantially the same as this member except for the manner in which it is formed. As shown in Fig. 7 it consists of a curved piece of suitable metal having a plurality of surfaces at least one of which has a curvature different from and continuously varying with respect to the remaining surfaces. The plurality of surfaces is obtained by providing a groove 51 longitudinally of the rocker. In this form of this invention the groove 51 is milled into the member 49 and is such that it forms a curved surface 52 centrally of the member 49 which is slightly eccentric to the remaining surfaces 53 and 54 of the member, this eccentricity manifesting itself by an increase in distance between the inner surface 52 and the outer surfaces 53 and 54 as the member 49 is rotated clockwise. While this is the preferred embodiment of this form of my invention, it is to be understood that the surface 52 may have any desired curvature. In this respect the surface 52 resembles the surface presented by center leg 24 shown in Fig. 1.

Firmly secured to the rocker member 49, at one end thereof, by means of screws 55 and 56 are the members 48 which are arranged to engage the curved surfaces 53 and 54 so as to be wrapped or wound thereon when the rocker member is rotated counterclockwise. The opposite ends of the members 48 are attached to a plate 57 by means of rivets 58 and 59. Provided in the plate 57 is an opening in which is located a sleeve 60 provided with an integrally formed washer 61. A screw 62 is adapted to extend through the washer 61 and sleeve 60 and into the sole plate thereby firmly securing the plate 57 to the sole plate.

The end of the rocker to which the members 48 are attached is adapted to carry a bridging contact assembly comprising a bracket 63 having secured thereto a channel-shaped support 64 bent in the form of an L so as to project perpendicularly from the surface of the bracket 63 and a bridging contact member 65 carried by the support 64. The screws 55 and 56 are provided with nuts 66 and 67 for securing the bracket to the rocker and insulating washers 68 formed of some suitable insulating material, such as sheet mica, are arranged to insulate the rocker from the bracket. The bridging contact member 65 is secured to a thin, highly resilient strip 69 which is riveted to the support 64. L-shaped brackets 70 are pressed out of the support 64 so as to provide supports for the strip 69 and its associated bridging contact member 65 when the rocker is rotated clockwise. The bridging contact member 65 is adapted to cooperated with a pair of fixed contacts 71 and 72 each of which comprises a suitable contact surface 73 carried by an arm 74 which is firmly secured by means of screws 75 to the current carrying brackets 76. The resilient strip 69 is arranged to maintain the contact pressure between the bridging contact member 65 and the fixed contacts 71 and 72 until there has been an appreciable movement of the rocker. This avoids a drop of the contact pressure to zero and thereby substantially eliminates chattering of the contacts.

It will be understood that the brackets 76 are fixed relative to the sole plate. In the arrangement shown in Fig. 5, one of the brackets 76 is soldered to one end of the terminal of heating unit 2 and the other bracket 76 is adapted to be carried by a contact prong (not shown). It will also be understood that by means of brackets 76 the fixed contacts 71 and 72 are arranged in a heating circuit similar to that described in connection with Figs. 1 and 2 so that movement of the bridging contact away from the fixed contacts will open the heating circuit.

Firmly attached by means of screw 77 to the end of the rocker member 49 opposite that to which the members 48 are secured is one end of the resilient member 50 which is arranged so as to engage the curved surface 52 of the rocker and be wrapped or wound thereon when the rocker is rotated clockwise. The opposite end of the resilient member 50 is provided with an opening in which is inserted a bushing 78 having an integrally formed spacing washer 79 engaging the lower surface of the member 50. An additional washer 80 is pressed on a portion of the bushing extending above the upper surface of the member 50. The manner in which this end of member 50 is anchored will appear hereinafter.

In the arrangement shown in Figs. 4 and 5 improved means are illustrated for adjusting the temperature at which the control device operates. Provided in the sole plate adjacent the rear end thereof is a recess 81 situated between the walls 46 and 46a and extending longitudinally of the passageway 47. Arranged in the recess 81 is a plate 82 which is firmly secured to the sole plate by means of screws 83 and 84. Rotatably mounted in the front end of the plate 82 is a shaft 85 on which is pressed a cam 86. The cam 86 is arranged on the shaft 85 adjacent the upper surface of plate 82. The purpose of this cam will be more fully described hereinafter. The free end of shaft 85 is adapted to extend outside of the cover (not shown) of the iron and is provided with a knurled portion 87 to which may be firmly secured a suitable operating handle (not shown) to facilitate the turning of shaft 85. The operating handle will be located outside of the cover of the iron similar to the arrangement shown in Fig. 1.

Pivotally mounted in one corner of the plate 82 adjacent the rear edge thereof by means of a rivet 88 is a second plate 89 which is provided with a forwardly extending arm 90 which is adapted to engage the surface of cam 86. Secured in the plate 89 is a stud 91 by which the member 50 is anchored to the plate 89. In securing the member 50, means including the bushing 78 and washers 79 and 80 arranged in the end of the resilient member 50, as previously described, are provided for allowing a limited relative rotation between member 50 and the plate 89 as the plate is rotated about its pivot. With such an arrangement it will be observed that rotation of the shaft 85 clockwise causes a similar rotation of cam 86 which in turn produces a counterclockwise rotation of the plate 89. This counterclockwise rotation has the effect of moving the point of support of the member 50 outwardly. This is similar to the movement produced by an expansion of the sole plate. It is apparent, therefore, that by the clockwise rotation of the shaft 85 the temperature at which the control device is actuated is reduced. In the same way rotation of the shaft 85 counterclockwise would cause the point of attachment of member 50 to move inwardly thereby increasing the temperature at which the control device operates.

With the control set for some predetermined temperature and the bridging contact in its normally closed position, the operation of this modified form of my invention is substantially the same as that described with reference to the form shown in Figs. 1 and 2. Upon the occurrence of the predetermined temperature in the sole plate, the rocker is rotated clockwise and the bridging contact 65 is quickly and with a snap-action moved away from the fixed contacts 71 and 72 thereby opening the heating circuit. Upon a decrease of temperature in the sole plate, the heating circuit is closed with a snap-action. In tests on an electric iron embodying this modified form of my invention, it was found that there was substantially no overshoot over the entire range of operating temperatures. In each instance the temperature of the sole plate on the first cycle of operation was substantially the same as the temperature obtained in the succeeding cycles. In addition, it was found that the regulation of the particular iron tested was substantially zero, i. e., there was substantially no decrease in temperature of the sole plate with increases in load.

From the foregoing description it is apparent that simple and rugged means are provided for controlling an electric heating circuit so as to eliminate temperature overshoot and considerably improve the regulation thereof. In each of the modified forms of this invention one of the salient features has been the provision of a novel system for amplifying small thermal movements. With this novel system the degree of amplification and type of action obtained may be readily and simply controlled by the designer. In addition, it is possible to obtain in either of the forms of this invention a relatively large contact opening without increasing the amplitude of the control device.

While several forms of this invention, as applied to an electric flat iron, have been described, it is to be understood that it is of general application, particularly where it is desired to control an electric circuit in response to temperature changes which manifest themselves as small thermal movements of an expansible member. It is, therefore, intended in the appended claims to cover all modifications within the true spirit and scope of this invention.

What I claim as new and desire to secure by Letters Patent of the United States is:

1. In a circuit controlling system for an electric iron having a sole plate, a rocker, a plurality of curved surfaces on said rocker, substantially non-expansive means connected to one end of said rocker and adapted to be wrapped over certain of said surfaces, resilient means connected to the opposite end of said rocker and adapted to be wrapped over the remainder of said surfaces, said remainder of said surfaces having a degree of curvature different from said first mentioned surfaces, and means connecting said substantially non-expansive means and said resilient means to remote points on said sole plate whereby movement of said sole plate in response to changes in temperature is transmitted to said rocker and amplified thereby.

2. In a circuit controlling device for electric appliances, an expansible member associated with the working surface of said appliance, a substantially non-expansible member associated with said expansible member, switch means, and means for actuating said switch means in accordance with the relative movement between said expansible member and said substantially non-expansible member when said members are subjected to thermal changes, said means including a rocker having a plurality of curved surfaces at least one of which has a curvature different from the remaining surfaces, means connecting said rocker to said members so that one of said members engages said one surface and the other member engages said remaining surfaces, whereby the small relative movement between said members is amplified into relatively large angular movement of said rocker, and means associated with said rocker for actuating said switch means.

3. In a control device, a pair of members, means producing a differential expansion of said members, a rocker having a plurality of surfaces of different curvature connected to said members so as to amplify said differential expansion, switch means, and means associated with said rocker for actuating said switch means.

4. In a control device, members adapted to move relatively when subjected to thermal change, a rocker connected between said members and arranged to amplify said relative movement, said rocker having a plurality of curved surfaces at least one of which has a curvature different from the remaining surfaces, switch means associated with said rocker and adapted to be actuated thereby, and resilient means associated with said rocker for biasing said switch means to one of its circuit controlling positions.

5. In a control device, switch means having an opened and closed position, a member having a plurality of curved surfaces, certain of said surfaces having a curvature different from and continuously changing with respect to the curvature of the remainder of said surfaces, means adapted to move in response to thermal changes, means connecting said last mentioned means to said member so that said thermal movement is amplified by said surfaces of different curvature, switch actuating means associated with said member so that said switch means is operated in accordance with said amplified thermal movement, and means for operating said switch actuating means with a snap-action, said means including said surface having said continuously changing curvature and resilient means associated with said member.

6. In a control device, switch means adapted to control an electric circuit, a member, a second member adapted to move differentially with respect to said first member, a rocker having a plurality of surfaces at least one of which has a curvature different from the remaining surfaces, means connecting one of said members to said rocker so that said member engages said surface of different curvature, means connecting the other of said members to said rocker, said last mentioned means engaging the remaining surfaces of said rocker, means interconnecting said first and second members and said rocker so that said members, said rocker, and said connecting means form a closed mechanical loop whereby relative movement of said members is transmitted to said rocker and by means of the surfaces of different curvature is amplified into relatively large angular movement, and means on said rocker for actuating said switch means in accordance with said amplified movement.

7. In a control device for an electric circuit, switch means movable between circuit opening and circuit closing positions, means responsive to thermal changes for moving said switch means to either of said positions with a snap-action, said means comprising a member, a second member adapted to move relative to said first member when subjected to thermal changes, a rocker, switch actuating means associated with said rocker, a plurality of surfaces on said rocker at least one of which has a curvature different from and continuously varying with respect to the remainder of said surfaces, means connecting one of said members to said rocker so that said member engages said surface having a different and varying curvature, and means connecting the other of said members to said rocker, said means engaging the remaining surfaces of said rocker whereby said last mentioned means interconnects said members and said rocker so as to form a closed mechanical loop so that relative translation between said members when subjected to thermal changes is transmitted to said rotker and by means of said curved surfaces is amplified into relatively large angular movement thereof, said angular movement being accelerated as rotation proceeds by said surface having said continuously varying curvature so that said switch means are actuated with a snap-action.

8. In a control device, members having different coefficients of expansion whereby there is relative movement therebetween when subjected to thermal changes, a rocker connected to said members so as to amplify said relative movement, said rocker having a plurality of surfaces thereon, at least one of which has a curvature different from and continuously varying with respect to the remaining surfaces, switch means, and means associated with said rocker for actuating said switch means, said surface having said curvature varying with respect to said remaining surfaces being adapted to move said rocker and said associated switch actuating means rapidly once movement is initiated whereby said switch means are actuated with a snap-action.

9. In a temperature control device for controlling an electric circuit, switch means having a circuit opening and circuit closing position, a member, a second member having a coefficient of expansion different from said first member, a rocker having a plurality of surfaces at least one of which has a curvature different from and continuously varying with respect to the remaining surfaces, means connecting one of said members to said rocker so that it engages and is adapted to be wound on said one surface when said rocker is rotated in one direction, resilient means connecting the other of said members to said rocker, said resilient means being adapted to engage and be wrapped upon the remaining surfaces of said rocker when said rocker is rotated in the opposite direction, means interconnecting said members so as to form a closed mechanical loop comprising said members, said rocker and said means connecting said members to said rocker, whereby relative movement between said members when subjected to thermal changes is transmitted to said rocker and by means of said curved surfaces is amplified thereby, said surface having said continuously varying curvature with respect to said remaining surfaces producing acceleration of said rocker so that once movement thereof is initiated it proceeds rapidly, and means associated with said rocker for actuating said switch means in accordance with movement of said rocker, said switch means being thereby moved to its circuit opening or circuit closing position with a snap-action in response to thermal changes.

10. In a temperature control device, switch means having circuit opening and circuit closing positions, an expansible member, a substantially non-expansible member, a rocker having a plurality of surfaces at least one of which has a curvature different from the remaining surfaces, resilient means connecting said expansible member to said rocker, said resilient means being adapted to engage and be wrapped on said one surface when said rocker is rotated clockwise, means connecting said non-expansible member to said rocker so as to engage and be wrapped on said remaining surfaces when said rocker is rotated counterclockwise, means connecting said non-expansible member to said expansible member so that a closed mechanical loop is formed including said rocker, said resilient means, said expansible and non-expansible members, whereby movement of said expansible member relative to said non-expansible member in response to thermal changes is transmitted to said rocker and by means of said surfaces of different curvature is amplified to relatively large angular movement thereof, and means associated with said rocker for operating said switch means to its circuit opening or circuit closing position depending upon the temperature setting of said device.

11. In a temperature control device, switch means having circuit opening and circuit closing positions, an expansible member, a substantially non-expansible member, a rocker having a plurality of surfaces at least one of which has a curvature different from the remaining surfaces, resilient means connecting said expansible member to said rocker, said resilient means being adapted to engage and be wrapped on said one surface when said rocker is rotated clockwise, means connecting said non-expansible member to said rocker so as to engage and be wrapped on said remaining surfaces when said rocker is rotated counterclockwise, means connecting said non-expansible member to said expansible member so that a closed mechanical loop is formed including said rocker, said resilient means, said expansible and non-expansible members whereby movement of said expansible member relative to said non-expansible member in response to thermal changes is transmitted to said rocker and by means of the curved surfaces thereof is amplified to relatively large angular movement thereof, means associated with said mechanical loop for varying the temperature at which said control device is operated, and means associated with said rocker for operating said switch means to its circuit opening or circuit closing position depending upon the temperature setting of said device.

12. A motion amplifying member comprising a curved member having a plurality of curved surfaces thereon, one of which has a curvature different from and continuously varying with respect to another of said surfaces.

13. A rocker for a motion amplifying system comprising a section of a cylinder, a plurality of surfaces formed in said section, one of said surfaces having a curvature different from and continuously varying with respect to another of said surfaces.

14. A rocker for a motion amplifying system comprising a cylindrical section, a plurality of leg members formed in said section, at least one of said leg members being arranged eccentric to and having a different radius from the remaining leg members.

15. A motion amplifying arrangement comprising a member having a plurality of curved surfaces at least one of which has a curvature different from and continuously varying with respect to the remaining surfaces, means attached to one end of said member and adapted to engage said one surface so as to be wrapped thereon when said member is rotated in one direction, means attached to the opposite end of said member and adapted to engage said remaining surfaces so as to be wrapped thereon when said member is rotated in the opposite direction, and means for transmitting to said last two means the motion which is to be amplified whereby said member is rotated and, by means of said surfaces of different curvature, small movements transmitted to the system are amplified into relatively large angular movements of said member.

16. In a system for amplifying small linear movements into relatively large angular movements, a rocker having a plurality of curved surfaces, certain of said surfaces having a curvature different from and continuously varying with respect to the remainder of said surfaces, means attached to one end of said rocker and adapted to be wrapped on said certain surfaces when said rocker is rotated in one direction, means attached to the opposite end of said rocker and adapted to be wrapped on said remainder of said surfaces when said rocker is rotated in the opposite direction, means for transmitting to said last two means the linear movement to be amplified whereby said rocker is rotated and, by means of said surfaces of different curvature, the linear movement is amplified to relatively large angular movements of said rocker.

17. In a control device, control means, temperature responsive means adapted to produce small movements in response to thermal changes, a member having a plurality of surfaces one of which has a curvature different from the remaining surfaces, means for connecting said member to said temperature responsive means so that said small movements of said temperature responsive means are amplified by said difference in curvature of said surfaces to produce a large movement of said member, and means for operating said control means in accordance with the movement of said member.

18. In a control device, control means, temperature responsive means adapted to move through small distances in response to changes in temperature, a member having a plurality of curved surfaces one of which has a curvature different from and continuously varying with respect to the remaining curved surfaces, means for connecting said curved surfaces to said temperature responsive means so that said small movements of said temperature responsive means are transmitted to said curved surfaces and are amplified thereby to produce a relatively large movement of said member, said surface having said different and continuously varying curvature causing said member to accelerate once movement is initiated thereby producing a snap action movement of said member, and means for actuating said control means in response to said movement of said member.

19. A control device for a sadiron having a sole plate adapted to move in response to temperature changes comprising a rocker, a plurality of curved surfaces on said rocker, at least one of which has a curvature different from the remaining surfaces, substantially non-expansive means connected to one end of said rocker so as to be wrapped on certain of said surfaces having the same curvature, resilient means connected to the opposite end of said rocker so as to be wrapped on said surfaces having said different degree of curvature, means for attaching said substantially non-expansive means and said resilient means to remote points on said sole plate, control means, and means associated with said rocker for actuating said control means in response to the movement of said rocker.

20. A control device for an electric iron having a sole plate adapted to move in response to temperature changes comprising switch means and means for actuating said switch means in accordance with the movement of said sole plate, said means comprising a rocker having a plurality of curved surfaces, certain of said surfaces having a curvature different from the remainder of said surfaces, a substantially non-expansible member fixed at one end to said rocker so as to engage certain of said surfaces having the same degree of curvature, a resilient member secured to the opposite side of said rocker so as to engage the remainder of said surfaces having said different degree of curvature, means for securing the opposite ends of said non-expansible member and said resilient member to remote points on said sole plate so that upon movement of said sole plate in response to temperature changes a relatively large angular movement of said rocker is produced by the wrapping or unwrapping of said members on said curved surfaces, and means for actuating said switch means in accordance with the movement of said rocker.

21. A control device adapted to be actuated in accordance with movement of the sole plate of a sadiron in response to temperature changes comprising a rocker having a plurality of curved surfaces at least one of which has a varying radius of curvature, a substantially non-expansive member wrapped on certain of said surfaces and adapted to be connected to said sole plate at one point, a resilient member wrapped on the remainder of said surfaces and adapted to be connected to said sole plate at a point remote from the point of attachment of said non-expansive member, control means, and means for actuating said control means in response to the movement of said rocker in accordance with the relative winding and unwinding of said non-expansive and resilient members on said surfaces upon the movement of said sole plate with temperature changes.

22. In a control device, control means, a member having a plurality of curved surfaces at least one of which has a varying radius of curvature, means adapted to move small distances in response to thermal changes, means connecting said last mentioned means to said member so that said small thermal movements are amplified by said surfaces of different curvature, said surface of varying radius of curvature producing variable amplification as said member is moved, and means for operating said control means in accordance with the movement of said member.

23. A motion amplifying arrangement comprising a member having a plurality of curved surfaces at least one of which has a varying radius of curvature, means attached to one end of said member and adapted to engage said surface of varying radius of curvature so as to be wrapped thereon when said member is rotated in one direction, means attached to the opposite end of said member and adapted to engage said remaining surfaces so as to be wrapped thereon when said member is rotated in the opposite direction, and means for transmitting to said last two means the motion which is to be amplified whereby said member is rotated and by means of said surfaces of different curvature said motion transmitted to the system is amplified into relatively large angular movements of said member, said surface of varying radius of curvature causing said amplification to vary as said member is rotated.

24. A motion amplifying arrangement for amplifying relatively small movements comprising a curved member having a plurality of curved surfaces thereon, at least one of said surfaces having a curvature different from and varying with respect to the other of said surfaces, means for applying to said surfaces forces generated by the motion to be amplified, said curvature of said one surface being such that the arm of the couple applied by said forces to said member continuously varies as said member moves under the action of said forces.

THEODORE A. RICH.